United States Patent [19]

Tezuka et al.

[11] Patent Number: 4,936,406
[45] Date of Patent: Jun. 26, 1990

[54] POWER TRANSMITTING SYSTEM FOR A FOUR-WHEEL DRIVE VEHICLE

[75] Inventors: Kazunari Tezuka; Haruo Fujiki, both of Tokyo, Japan

[73] Assignee: Fuji Jokogyo Kabushiki Kaisha, Tokyo, Japan

[21] Appl. No.: 258,146

[22] Filed: Oct. 13, 1988

[30] Foreign Application Priority Data

Oct. 23, 1987 [JP] Japan .................. 62-268871
Oct. 24, 1987 [JP] Japan .................. 62-269079
Oct. 24, 1987 [JP] Japan .................. 62-269080

[51] Int. Cl.⁵ ............................................ B60K 17/34
[52] U.S. Cl. .................................................... 180/249
[58] Field of Search ............... 180/249, 250, 248, 247, 180/233

[56] References Cited

U.S. PATENT DOCUMENTS 4,669,569  6/1987  Suzuki et al. ................ 180/249
4,702,341 10/1987  Taga et al. .................... 180/249
4,727,954  3/1988  Matsumoto .................... 180/249
4,744,437  5/1988  Matsumoto .................... 180/249
4,805,721  2/1989  Takahashi et al. ............. 180/248

FOREIGN PATENT DOCUMENTS 55-83617 6/1980 Japan .
63-2729 1/1988 Japan .................. 180/249

Primary Examiner—Mitchell J. Hill
Attorney, Agent, or Firm—Martin A. Farber

[57] ABSTRACT

A torque distribution deciding control unit, a planetary gear device as a central differential and an oil hydraulic clutch having opposite disks are provided on a motor vehicle. The clutch is disposed between output members of the planetary gear device, whereby torque is transmitted to front and rear wheels at a distribution ratio decided by clutch torque of the clutch. The control unit operates the clutch so as to distribute the torque at a ratio in accordance with a steering angle of a steering wheel of the vehicle, and velocity and acceleration of the vehicle.

10 Claims, 7 Drawing Sheets

POWER TRANSMITTING SYSTEM FOR A FOUR-WHEEL DRIVE VEHICLE

BACKGROUND OF THE INVENTION

The present invention relates to a system for transmitting the power of an engine to four wheels of a four-wheel drive vehicle.

In a conventional four-wheel drive vehicle having a central differential, which is called a full time four-wheel drive vehicle, the central differential operates to uniformaly split the torque of the engine for the front wheels and rear wheels of the vehicle.

It is known that the distribution ratio of torque influences driveability, steerability, stability, starting characteristic and other factors. For example, the torque is split in accordance with the distribution of load on the front and rear wheels of the vehicle for good traction. If the torque split is controlled at cornering, a stable cornering characteristic can be obtained. Accordingly, the understeer encountered in a vehicle driven by front wheels and the oversteer encountered in a vehicle driven by rear wheels can be restrained. Further, on slippery roads, the distribution of the torque to the rear wheels can be increased so as to ensure safe driving without locking the differential mechanism.

Japanese Patent Laid Open No. 55-83617 discloses such a transmitting system in which the distribution ratio of torque for the front wheels to the rear wheels is controlled by electronically controlling a central differential with a clutch or brake.

However, the system has only a central differential as a means for distributing the torque. Therefore, the distribution ratio is constant. In addition, the system can only select a two-wheel drive mode, four-wheel drive mode or a differential locking mode and is not intended for controlling the distribution ratio of torque.

SUMMARY OF THE INVENTION

The object of the present invention is to provide a system which may control the distribution ratio of torque to the front wheels and rear wheels in accordance with various driving conditions of a four-wheel drive vehicle.

The other objects and features of this invention will become understood from the following description with reference to the accompanying drawings

DETAILED DESCRIPTION OF THE PREFERRED EMBODIMENTS

Figure 1:
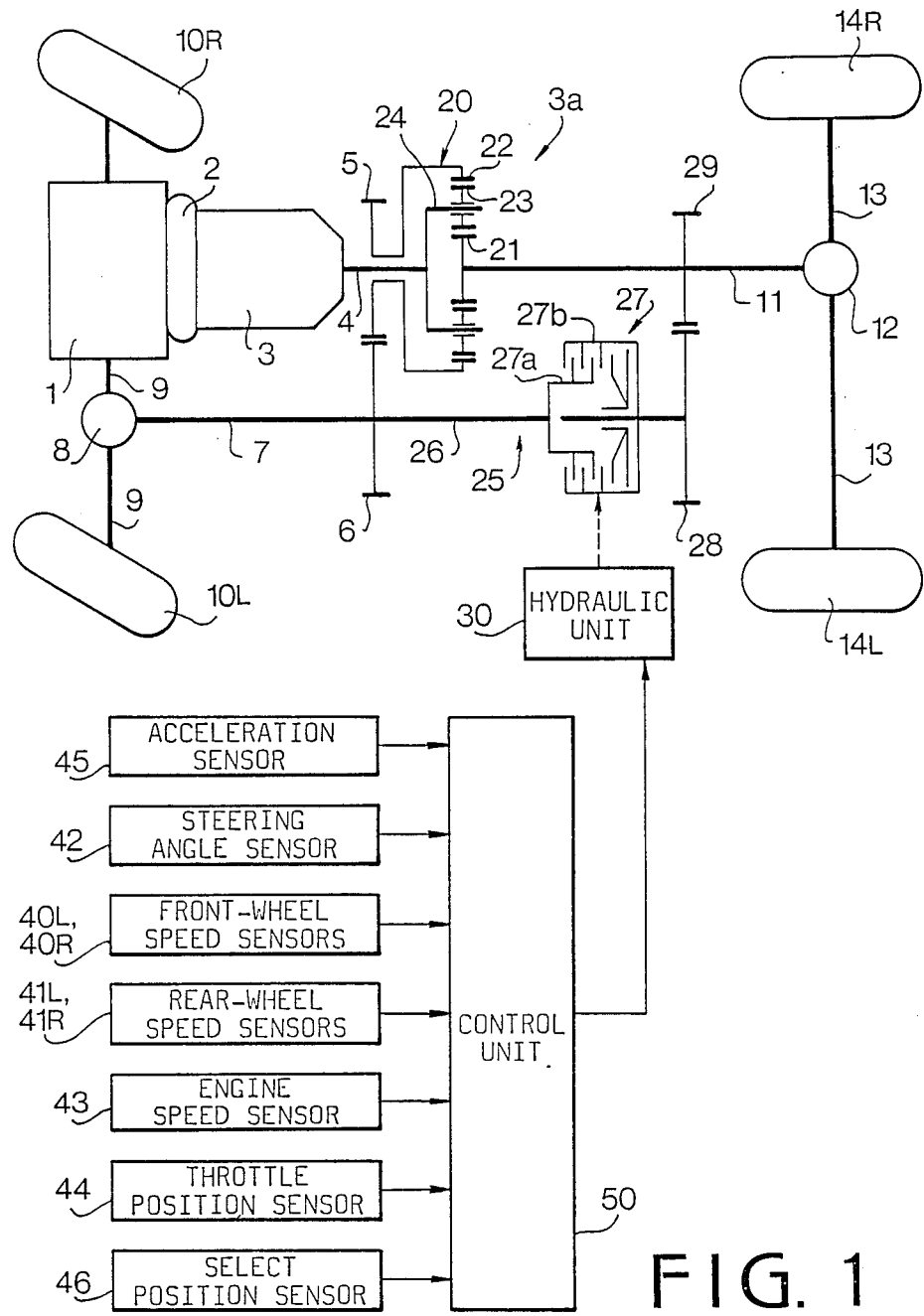
FIG. 1 is a schematic diagram showing a system according to the present invention.

Referring to FIG. 1 showing a power transmission system for a four-wheel drive vehicle, reference numeral 1 designates an engine mounted on a front portion of the vehicle. The power of the engine 1 is transmitted to a transfer device 3a through a torque converter 2 and an automatic transmission 3. In the transfer device 3a, rotation of an output shaft 4 of the transmission 3 is transmitted to a central differential 20. The central differential 20 is a planetary gear device and comprises a sun gear 21, a ring gear 22 having internal teeth, a carrier 24, and planet pinions 23 rotatably supported on the carrier and engaged with both gears 21 and 22. The carrier 24 is connected with the output shaft 4. The ring gear 22 is connected to a gear 5 rotatably mounted on the shaft 4 and in mesh with a gear 6 having the same diameter as the gear 5 and fixedly mounted on a front drive shaft 7. The front drive shaft 7 is operatively connected to a front differential 8 so as to drive front wheels 10R and 10L through axles 9. On the other hand, the sun gear 21 is fixedly mounted on a rear drive shaft 11 so as to drive rear wheels 14R and 14L through a rear differential 12 and axles 13. Thus, the central differential 20 operates to split the torque of the engine at a ratio determined by the gear ratio thereof. The split torque is distributed to the front and rear wheels by the transfer device 3a as described hereinafter. The difference between speeds of the front and rear wheels is absorbed by the central differential.

In the present arrangement of the transmission system, since static load on the front part of the vehicle is larger than that of rear part, the central differential 20 is adapted to transmit a large torque to the front wheels through the ring gear 22 having a large diameter and to transmit a smaller torque to the rear wheels through the sun gear 21 having a small diameter In the system of the present invention, a torque split control device 25 is provided across the central differential 20. The torque split control device 25 includes the gears 5 and 6, a bypass shaft 26 coaxially secured to the front drive shaft 7, a gear 29 secured to the rear drive shaft 11, and a gear 28 in mesh with the gear 29. The gears 28 and 29 are arranged to have a gear ratio which is slightly smaller than 1. The shaft 26 is connected to a hub 27a of an oil hydraulic clutch 27 and gear 28 is secured to a drum 27b of the clutch 27. The clutch has a plurality of disks secured to the hub 27a and drum 27b, respectively.

The clutch 27 is arranged to transmit the torque from a higher speed disk side to a lower speed disk side. When pressurized oil is supplied to the clutch 27 from a hydraulic unit 30, a clutch torque is generated therein, thereby engaging the clutch 27. Since the drum 27b is rotated at a slightly smaller rate than the hub 27a, torque dependent on the clutch torque is transferred from the hub 27a to the drum 27b and to the rear wheels. Thus, torques $T_F$ and $T_R$ transmitted to the front and rear drive shafts 7 and 11 are respectively expressed as follows.

$$T_F = \gamma \cdot Ti - T_C \quad (1)$$

$$T_R = (1-\gamma) \cdot Ti + KT_C \quad (2)$$

where Ti is input torque transmitted to the central differential 20, $\gamma$ is distribution ratio for the front wheels predetermined by the central differential 20, K is the gear ratio of gears 28, 29, and $T_C$ is the clutch torque.

Accordingly, as the clutch torque $T_c$ increases, the distribution ratio for the front torque $T_F$ becomes smaller than the distribution ratio $\gamma$. On the other hand, the distribution ratio of the rear torque $T_R$ becomes larger than the ratio $(1-\gamma)$. Thus, the torque distribution can be continuously varied.

An electronic control system for controlling the torque split has left and right front-wheel speed sensors 40L and 40R, left and right rear-wheel speed sensors 41L and 41R, steering angle sensor 42, engine speed sensor 43, throttle position sensor 44, acceleration sensor 45 and a select position sensor 46 for determining the selected gear in the automatic transmission 3.

A control unit 50 which is supplied with outputs of the sensors 40 to 46 produces an output signal which is applied to the hydraulic unit 30 to control oil pressure applied to the oil clutch 27.

The hydraulic unit 30 for the clutch 27 is described hereinafter with reference to FIG. 2a. The hydraulic unit 30 comprises a pressure regulator valve 32, a transfer control valve 36 and a solenoid operated valve 34. The pressure regulator valve 32 is communicated with a passage 31 through which a line pressure of the automatic transmission 3 is supplied. The regulator valve 32 operates to provide a constant pilot pressure in a passage 33 by controlling the oil supplied to the passage 33 and drained therefrom. The passage 33 is communicated with the solenoid operated valve 34 and to an end of the transfer control valve 36 through a passage 35. The transfer control valve 36 is communicated with the passage 31 and with the clutch 27 through a passage 37. The solenoid operated valve 34 is operated by pulses from the control unit 50 at a duty ratio determined therein, thereby controlling the drain of the oil to provide a control pressure $P_C$. The control pressure $P_C$ is applied to an end of a spool 36a of the transfer control valve 36 to control the oil supplied to the clutch 27 so as to control the clutch pressure (torque).

Figures 2A, 2B:
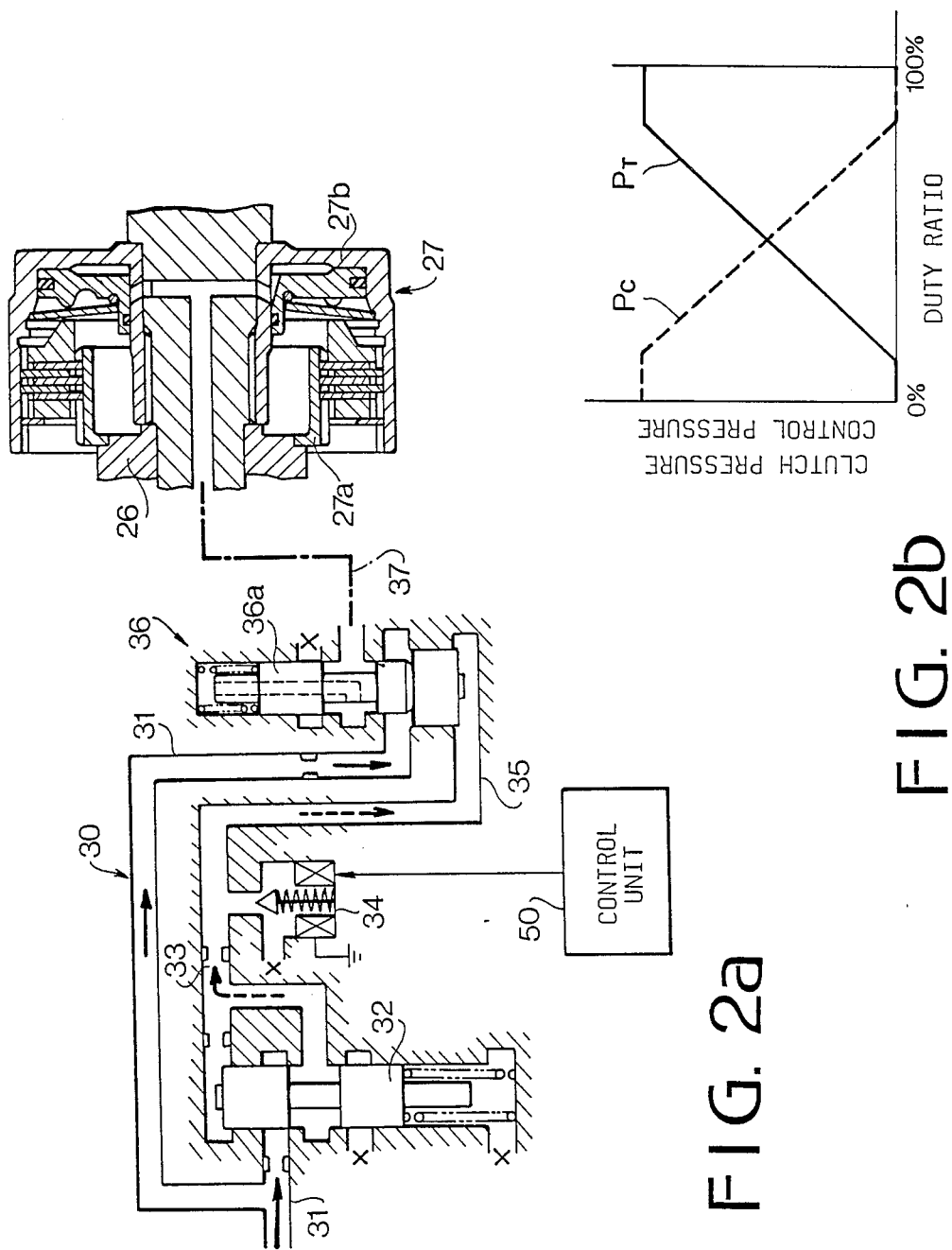
FIG. 2a shows a hydraulic circuit for controlling a hydraulic clutch.
FIG. 2b is a graph showing a characteristic of a clutch pressure.

FIG. 2b shows the relationship between the clutch pressure $P_T$, control pressure $P_C$ and duty ratio. When the duty ratio is at 0%, the solenoid operated valve 34 does not drain the oil. Accordingly the control pressure $P_C$ is at the highest value which is equal to the pilot pressure. As the duty ratio increases, the control pressure $P_C$ reduces as shown by a broken line. On the other hand, the clutch pressure $P_T$ is zero in a small duty ratio range and increases with increase of the duty ratio.

Figure 3:
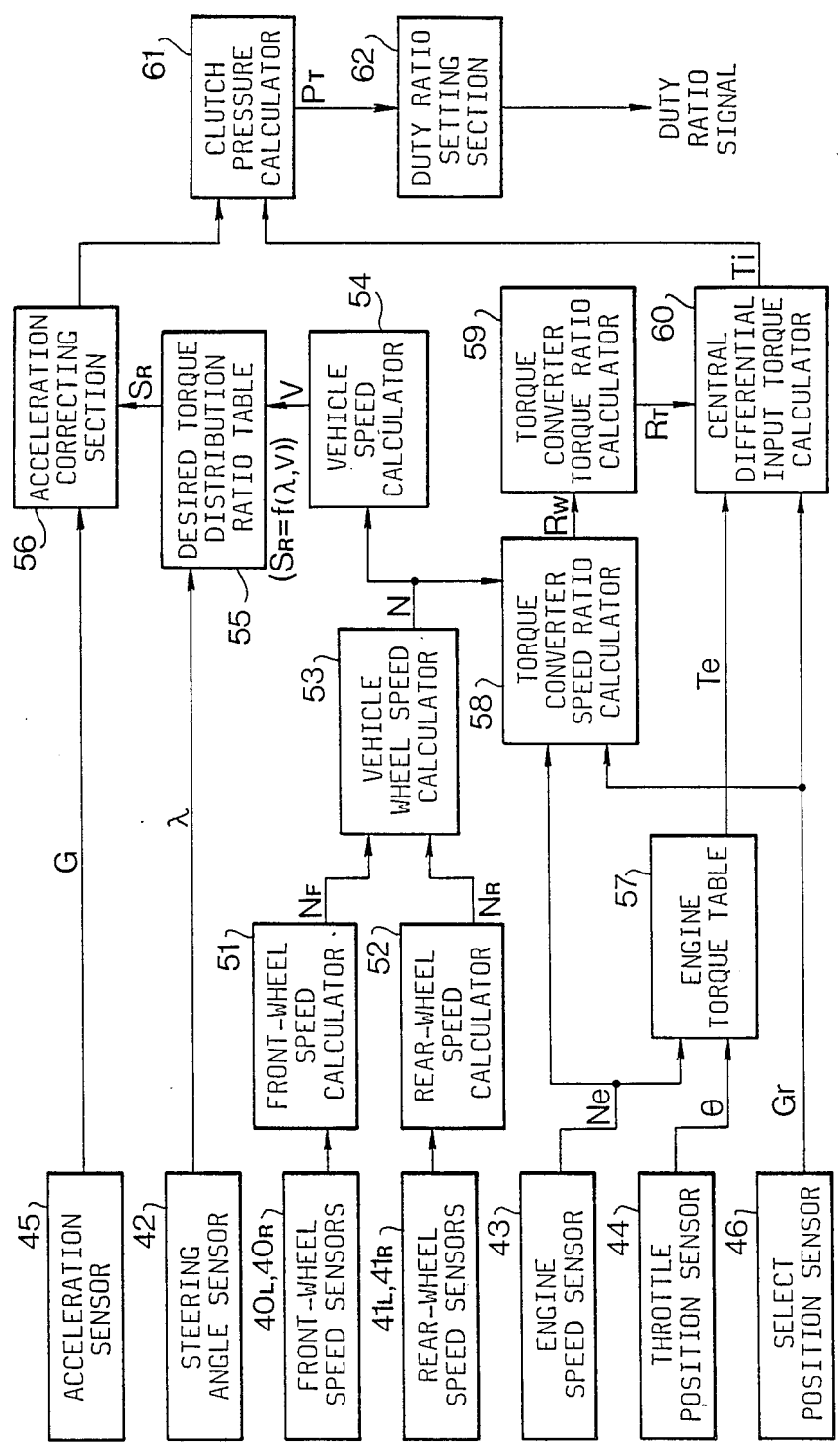
FIG. 3 shows a block diagram of a control unit of a first embodiment of the present invention.

Referring to FIG. 3, the control unit 50 has a front wheel speed calculator 51 to which speeds $N_{FL}$ and $N_{FR}$ from the left and right front-wheel sensors 40L and 40R are applied, and a rear-wheel speed calculator 52 to which speeds $N_{RL}$ and $N_{RR}$ from the left and right rear wheel speed sensor 41L and 41R are applied. Front wheel speed $N_F$ and rear wheel speed $N_R$ are obtained from the following equations.

$$N_F = (N_{FL} + N_{FR})/2$$

$$N_R = (N_{RL} + N_{RR})/2$$

The speeds $N_F$ and $N_R$ are fed to a vehicle wheel speed calculator 53 where the average speed N of the four wheels is calculated as follows.

$$N = (N_F + N_R)/2$$

The speed N is applied to a vehicle speed calculator 54 where vehicle speed V is obtained from the speed N and diameter of tires of the vehicle.

The vehicle speed V and the steering angle $\lambda$ detected by the steering angle sensor 42 are applied to a desired torque distribution ratio table 55. The desired torque distribution ratio table 55 is stored with a plurality of torque distribution ratios $S_R$ for the rear wheels provided from a graph shown in FIG. 4a. The table provides a distribution ratio $S_R$ in accordance with the steering angle $\lambda$ and the vehicle speed V. When the vehicle is steered at a small radius in a middle speed range, the desired torque distribution ratio $S_R$ is increased so as to improve the steerability of the vehicle. To the contrary, if the vehicle is steered at a large radius at a high speed, the desired distribution ratio $S_R$ becomes small in order to ensure stability of the vehicle. In other regions, the distribution ratio is set so as to comply both with the steerability and stability. The desired distribution ratio $S_R$ is applied to an acceleration correcting section 56 to which an acceleration G from the acceleration sensor 45 is applied to correct the distribution ratio in accordance with the acceleration. If the acceleration G is zero, the vehicle is in a steady state so that no correction is performed.

Figure 4A:
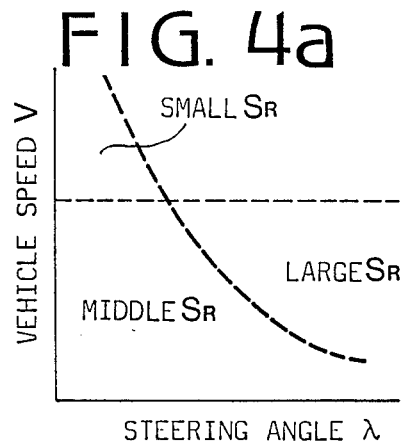
FIG. 4a is a graph showing a torque distribution ratio in accordance with the vehicle speed and steering angle.
Figure 4D:
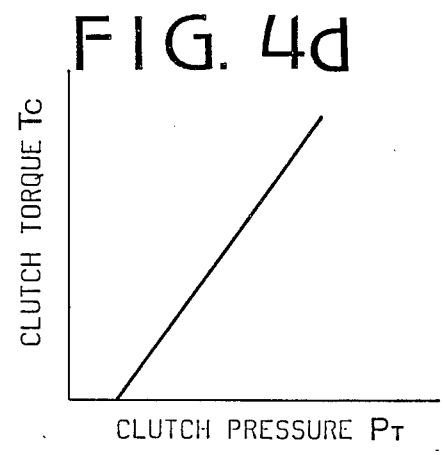
FIG. 4d is a graph showing a characteristic of clutch torque in accordance with clutch pressure.
Figure 4B:
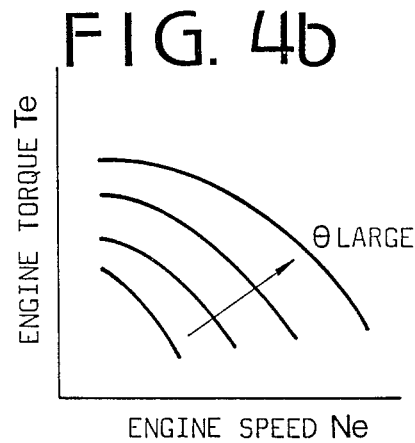
FIG. 4b is a graph showing engine torques in accordance with engine speed and throttle valve opening degree.

Engine speed Ne and throttle opening degree $\theta$ from the engine speed sensor 43 and the throttle position sensor 44 are applied to an engine torque table 57 from which engine torque Te is derived in accordance with Ne and $\theta$ as shown in a graph of FIG. 4b. The engine speed Ne, the vehicle wheel speed N and transmission ratio Gr detected by the select position sensor 46 are applied to a torque converter speed ratio calculator 58. The calculator 58 calculates a turbine speed Nt, which is an output speed of the torque converter 2, from the vehicle wheel speed N and the transmission ratio Gr. Speed ratio Rw between the engine speed Ne which is an input speed of the torque converter 2 and the output speed Nt is $$Rw = Nt/Ne.$$

Figure 4E:
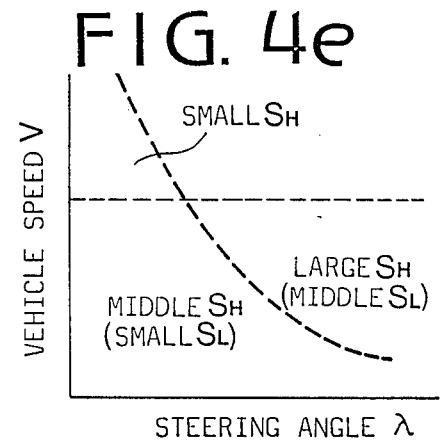
FIG. 4e is a graph showing a torque distribution ratio in accordance with vehicle speed and steering angle in a second embodiment of the present invention.
Figure 4C:
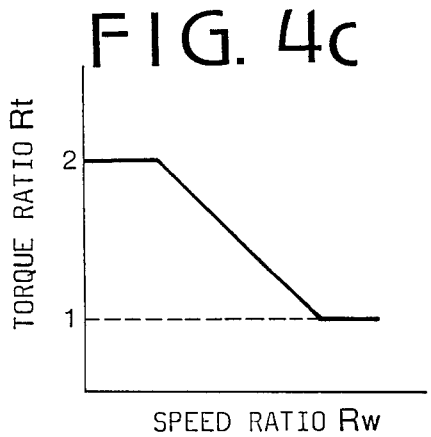
FIG. 4c is a graph showing a characteristic of torque ratio in accordance with speed ratio.

The speed ratio Rw is applied to a torque converter torque ratio calculator 59 from which a torque ratio Rt of the torque converter is derived as shown in FIG. 4c. The torque ratio Rt is applied to a central differential input torque calculator 60 to which engine torque Te and transmission ratio Gr are also applied. The input torque Ti to the central differential 20 is calculated as follows.

$$Ti = Te \cdot Rt \cdot Gr$$

The desired torque distribution ratio $S_R$ or its corrected value and the torque Ti are applied to a clutch pressure calculator 61. The distribution ratio $S_R$ can be expressed as below.

$$S_R = T_R/(T_F + T_R)$$

In accordance with the afore-described equations (1) and (2), the clutch torque $T_C$ can be expressed as $$T_C = f(S_R, T_i)$$

Accordingly, the clutch torque increases with the increase of the torque distribution ratio $S_R$ and input torque $T_i$. The clutch pressure $P_T$ is an increasing function of the clutch torque $T_C$, depending on the number of disks in the clutch 27 and friction coefficient between the disks. Thus, the clutch pressure $P_T$ is expressed as $$P_T = g(T_C)$$

as shown in a graph of FIG. 4d. The clutch pressure $P_T$ is applied to a duty ratio setting section 62 where a duty ratio signal corresponding to the clutch pressure $P_T$ applied to the hydraulic clutch 27 is obtained.

When drive range is selected, the output torque of the engine is transmitted through the torque converter 2 and the transmission 3 to the central differential 20 at which the torque is divided to the ring gear 22 and sun gear 21, for example at a ratio 60:40, in accordance with a static load of the vehicle. The divided torques are transmitted to front and rear drive shafts 7 and 11. At the same time, the torques are transmitted to hub 27a of the oil clutch 27 through gears 5, 6 and shaft 26 and to the drum 27b through gears 29 and 28, respectively. Since the speed of the drum 27b is reduced by the gear ratio K between gears 29 and 28, the torque is transmitted from hub 27a of higher speed side to the drum 27b of lower speed side.

During a steady driving state where the vehicle is not accelerated, that is, when the acceleration G is substantially zero, the desired torque distribution ratio $S_R$ for the rear wheels is held at a basic ratio of 40%. Therefore, the clutch pressure $P_T$ calculated at the calculator 61 is zero. Accordingly, duty ratio of the pulses applied to the solenoid operated valve 34 is set at zero at the duty ratio setting section 62. The control pressure $P_C$ is at maximum, thereby draining the oil in the clutch 27. Therefore, clutch pressure $P_T$ in the clutch 27 becomes zero so that the clutch is disengaged so as to render the members of the torque split control device 25 idle. Accordingly, the input torque is split to front and rear wheels 10R, 10L, 14R, 14L in accordance with the basic ratio.

If the vehicle is steered at a relatively small radius by a large steering angle while driven at a steady state at middle speed, the desired torque distribution ratio $S_R$ is increased. The control unit 50 applies corresponding pulses having a larger duty ratio, thereby draining the oil from the solenoid valve 34. Accordingly, the control pressure $P_C$ decreases, supplying a large amount of oil to the clutch 27. Consequently, a large clutch torque $T_C$ is produced in the clutch, so that a torque dependent on the clutch torque $T_C$ is transmitted from hub 27a to drum 27b. Accordingly, the torque $T_F$ to the front wheels is reduced by a torque based on the large clutch torque $T_C$. To the contrary, the torque $T_R$ to the rear wheels is greatly increased by a torque based on the clutch torque and the gear ratio K at gears 28 and 29.

On the other hand, if the vehicle speed V is low and the steering angle λ is small, the transfer torque is decreased to reduce the torque to rear wheels.

When the vehicle is accelerated, the load on the vehicle moves to the rear part of the vehicle In accordance with the movement of the load, the torque distribution ratio $S_R$ from the table 55 is increased in the correcting section 56, so as to increase the rear torque $T_R$, even if the vehicle is driven straight. Therefore, traction is improved. If the input torque Ti becomes small, the clutch pressure $P_T$ becomes small regardless of the value of the distribution ratio $S_R$ so that tight corner braking can be prevented.

The above described control patterns are summarized as set out in the following table.

TABLE

|  | STRAIGHT-AHEAD DRIVING | CORNERING |
| --- | --- | --- |
| STEADY STATE | BASIC DISTRIBUTION | DISTRIBUTION RATIO TO REAR WHEELS INCREASES |
| ACCELERATION | DISTRIBUTION RATIO TO REAR WHEELS INCREASES | |

Figure 5:
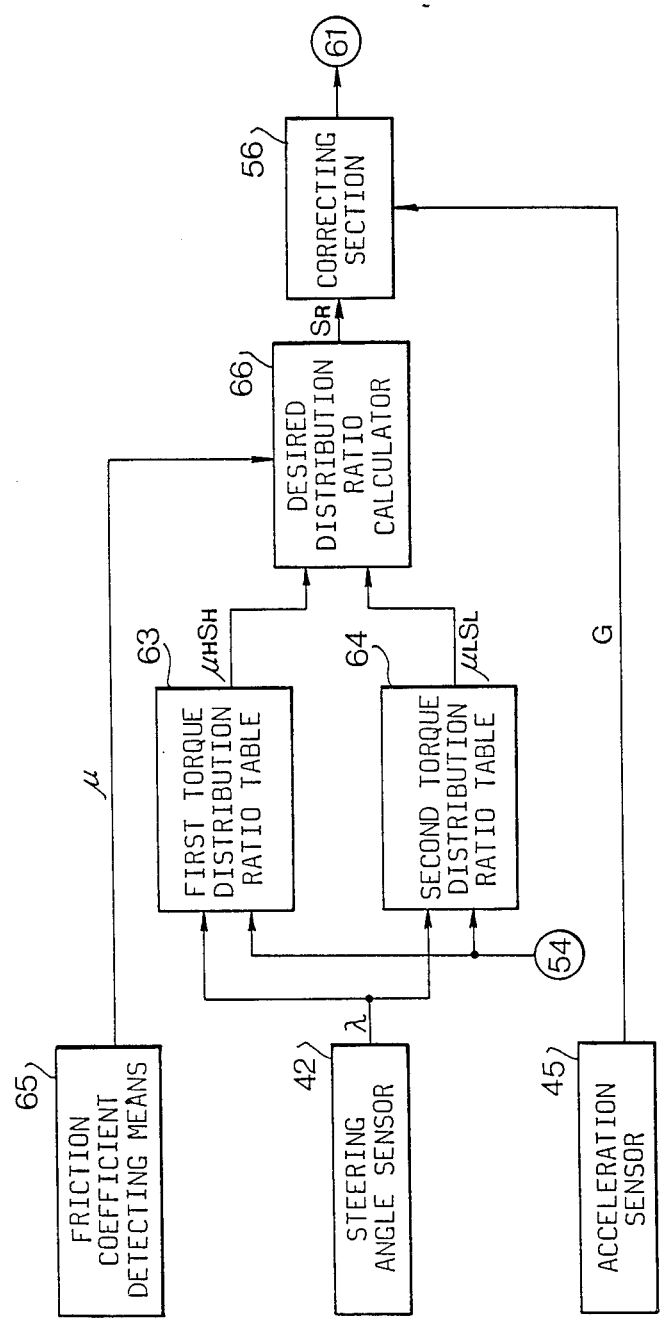
FIGS. 5 and 6 are block diagrams of control units of the second and third embodiments respectively.

Referring to FIG. 5 showing a second embodiment of the present invention, the control unit 50 has first and second rear wheel torque distribution ratio tables 63 and 64 and a desired torque distribution calculator 66 constituting first, second and third parts, respectively, of a desired torque distributing means instead of the desired torque distribution table 55 provided in the first embodiment. A friction coefficient detecting means 65 is further provided so as to apply a friction coefficient μ of a road surface on which the vehicle is driven, to the desired torque distribution calculator 66. The first table 63 stores a plurality of torque distribution ratios $S_H$ for high road friction coefficients μ on dry roads. The second table 64 stores a torque distribution ratios $S_L$ for low road friction coefficients μ on slippery roads such as snowy roads. The distribution ratios $S_H$ and $S_L$ have characteristics shown in a graph of FIG. 4e. The distribution ratios for high road friction coefficients are identical to those stored in the table 55 of the first embodiment, and the distribution ratio for low road friction coefficient are small as indicated in parenthesis. Accordingly, spinning is prevented on slippery roads, thereby ensuring stable driving.

The distribution ratios $S_H$ and $S_L$ are applied to the desired torque distribution ratio calculator 66 to calculate a desired torque distribution ratio $S_R$ for the rear wheels by interpolation as follows.

$$S_R = \{(S_H - S_L)/\mu H - \mu L)\}(\mu - \mu L) = S_L$$

where μH and μL are friction coefficients of road surfaces having a high and a low friction coefficient, respectively. The other construction and operations of the control unit 50 are the same as the first embodiment.

Thus, the distribution ratio can be linearly corrected in dependency on the friction coefficient μ of the road surface. The torque distribution ratio may be determined in accordance with a three dimensional map with steering angle, vehicle speed and friction coefficient as parameters.

Figure 6:
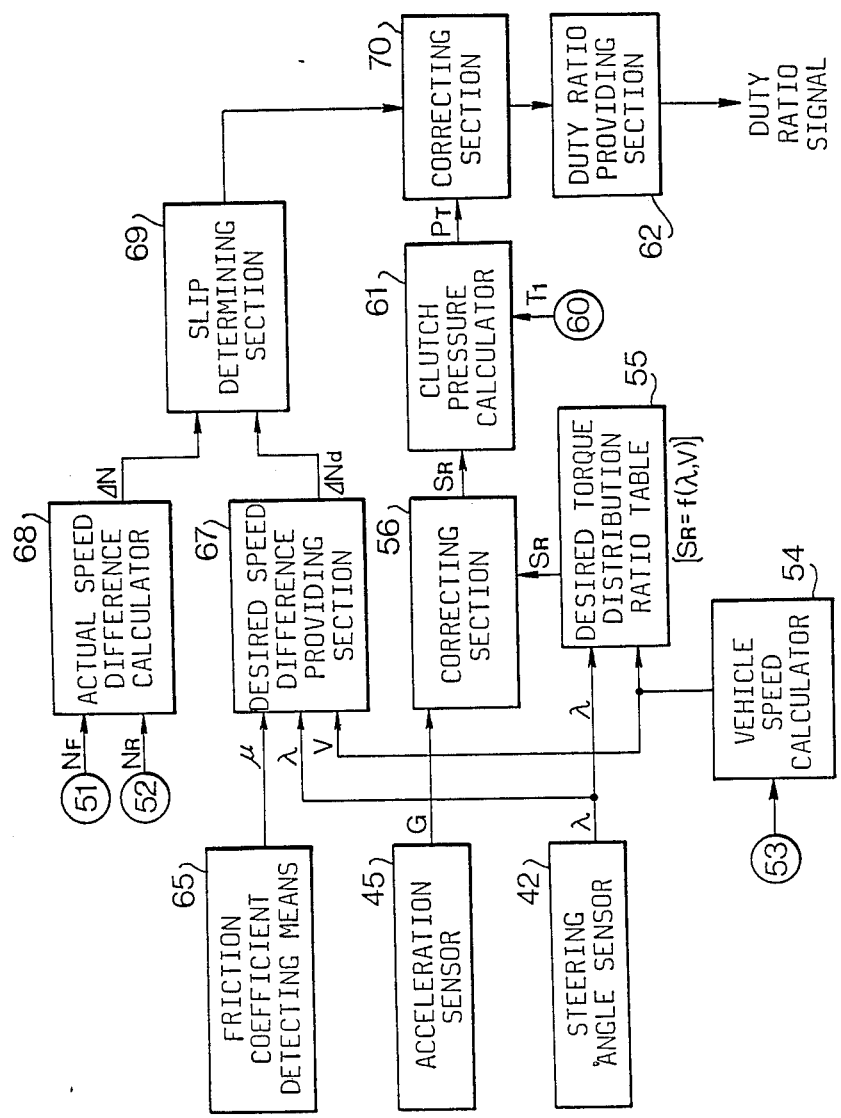

FIG. 6 shows a third embodiment of the present invention which is provided such that wheels are prevented from slipping and spinning. The control unit 50 has, in addition to that of the first embodiment, a friction coefficient detecting means 65, a desired speed difference providing section 67, an actual speed difference calculator 68 and a slip determining section 69.

Figure 4F:
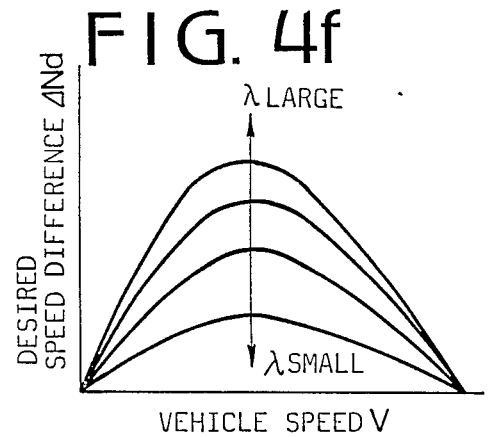
FIG. 4f is a graph showing desired speed differences between front and rear wheels in accordance with vehicle speed and steering angle in a third embodiment of the present invention.

The desired speed difference providing section 67 provides a desired speed difference ΔNd between the front and rear wheels in dependency on the vehicle speed V and steering angle λ. As shown in a graph of FIG. 4f, the desired speed difference ΔNd increases with the increase of the steering angle λ. The difference ΔNd also gradually increases with the increase of the vehicle speed V in a low vehicle speed region, and gradually decreases with further increases of the vehicle speed beyond a predetermined vehicle speed. When the steering angle is zero for driving the vehicle straight-ahead, the desired speed difference ΔNd is set at zero, so as to render the vehicle to follow an optimum path without slipping. Additionally, such an optimum path varies in dependency on conditions of the road surface and engine torque. Thus, in the present embodiment, the friction coefficient μ is applied to the desired speed difference providing section 67 to correct the speed difference ΔNd, that is by decreasing the difference as the friction coefficient decreases.

The actual speed difference calculator 68 calculates an actual difference ΔN of the front and rear wheel speeds as follows.

$$N = N_F - N_R$$

The desired and actual speed differences ΔNd and ΔN are applied to the slip determining section 69 where it is determined that either of front wheels or rear wheels are slipping when the actual difference ΔN deviates from the desired difference.
Namely when the actual speed difference ΔN is under the following conditions.

$$\Delta N > \Delta Nd + K1$$

$$\Delta N < \Delta Nd - K2$$

where K1 and K2 are constants corresponding to a dead zone for determining the slipping which is decided by the accuracy of the speed sensors, and other factors. The output of the slip determining section 69 is applied to a correcting section 70 to correct the clutch pressure in accordance with the slipping rate. When the difference ΔN is smaller than the value of ΔNd−K2, it can be assumed that the clutch 27 generates a large clutch torque, thereby limiting the differential operation of the central differential 20. Therefore, the clutch pressure $P_T$ is decreased to increase the torque to the front wheels.

Figure 7:
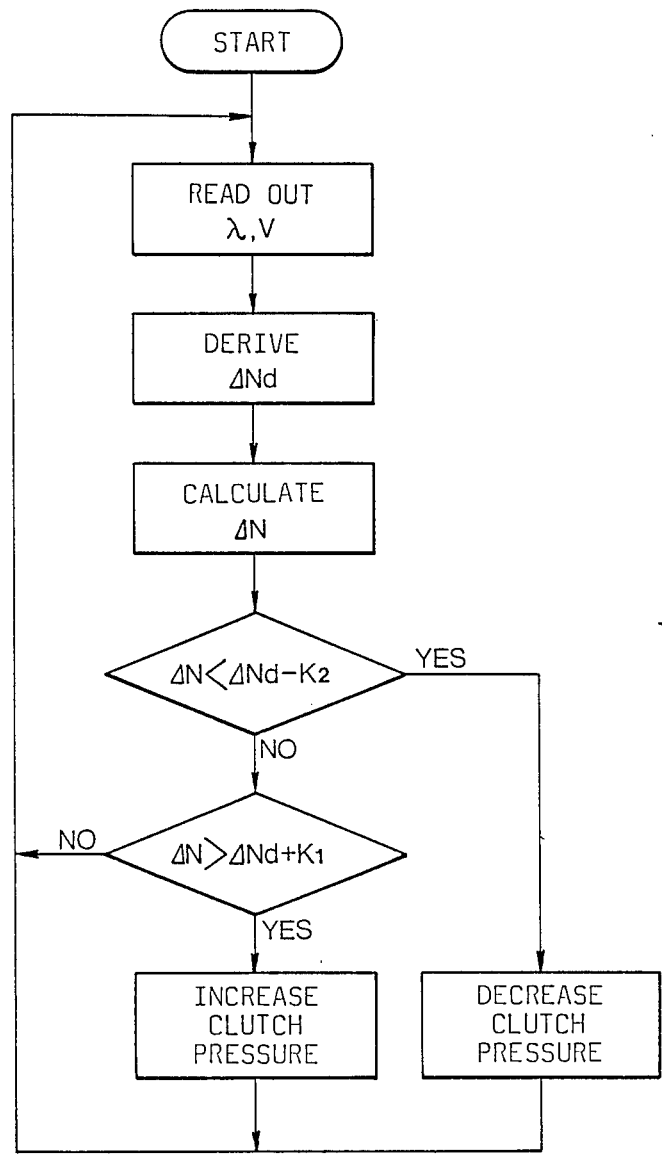
FIG. 7 is a flowchart showing the operation of the control unit in the third embodiment.

To the contrary, when the difference ΔN is larger than ΔNd+N1, the clutch pressure $P_T$ is increased to increase the rear torque. Thus, the actual difference ΔN converges to the desired difference ΔNd by the feedback control. Since the differential is not locked, the slipping is prevented while keeping steerability. The above-described operation is explained in a flowchart shown in FIG. 7.

When the front wheels or the rear wheels slip while the vehicle is driven straight ahead, the actual difference always becomes much larger than the desired difference (|ΔN| > |ΔNd|). In the present embodiment, the vehicle can get out of a stuck state or be driven by increasing the clutch pressure to limit the differential operation. Furthermore, on slippery roads, the difference ΔNd is decreased dependent on the friction coefficient μ so that the operation of the central differential 20 is limited, thereby preventing slipping.

In the control system of the present invention, the steerability of the vehicle can be improved by further increasing the torque distribution ratio shown in FIGS. 4a or 4e, thereby providing an active driving. The front and rear wheel speed sensors may be provided on respective drive shafts to directly detect the average speeds of the wheels. The present invention may also be applied to a vehicle without a torque converter and further modified to employ clutches other than a hydraulic clutch.

From the foregoing, it will be understood that the present invention provides a torque split system for a four-wheel drive vehicle where appropriate torque distribution ratios for the front and rear wheels are determined for various driving conditions such as steering and acceleration. Accordingly, loss of torque and over-heating of the clutch are prevented and the fuel consumption is improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a power transmitting system for a four-wheel drive motor vehicle having an engine, a transmission driven by said engine and having an output shaft, a rear drive shaft coaxially positioned with respect to said output shaft for transmitting power from said output shaft to rear wheels of the vehicle, a front drive shaft parallel to said output shaft and said rear drive shaft for transmitting power from said output shaft to front wheels of the vehicle, central differential means for connecting said output shaft to both of said drive shafts and for enabling different speeds between both of said drive shafts, the improvement of the system which comprises:

torque distributing means being coaxially connected to said front drive shaft and parallel with said rear drive shaft so as to form a closed pass with said transmission, and said front and rear drive shafts, said torque distributing means for changing torque distribution ratio of the power from said output shaft transmitted to said front and rear wheels;

first means responsive to driving conditions of acceleration of the vehicle, steering angle of said front wheels, and speed of said vehicle for providing an acceleration signal, a steering angle signal and a vehicle speed signal, respectively;

desired torque distributing means responsive to said steering angle signal and said vehicle speed signal for providing a desired torque distribution ratio between said front and rear wheels and for producing a desired torque distribution ratio signal;

correcting means responsive to said acceleration signal and said desired torque distribution ratio signal for correcting said desired torque distribution ratio and for producing a corrected desired torque distribution ratio signal; and actuating means responsive to said corrected desired torque distribution ratio signal for controlling said torque distributing means so as to distribute said power to said front and rear wheels at an optimum torque distribution ratio in dependency on said driving conditions.

2. The system according to claim 1, wherein said first means comprises an acceleration sensor for detecting acceleration of said vehicle for producing said acceleration signal, a steering angle sensor for detecting steering angle of said front wheels for generating said steering angle signal, and respective wheel speed sensors for detecting speed of each wheel of said front and rear wheels for producing a wheel speed signal for each wheel, and calculating means for calculating said vehicle speed signal from all of said wheel speed signals.

3. The system according to claim 1, wherein said first means further comprises road friction coefficient detecting means for detecting road friction coefficient for producing a road friction coefficient signal, and said desired torque distributing means being further responsive to said road friction coefficient signal for providing said desired torque distribution ratio signal.

4. The system according to claim 3, wherein said desired torque distributing means includes a desired distribution ratio calculator responsive to signals, from a first part and a second part of said desired torque distributing means, of a high and a low road friction coefficient and to said road friction coefficient signal.

5. The system according to claim 1, further comprising slip detecting means for comparing speed of said front and rear wheels for producing a slip signal for correcting said desired torque distribution ratio signal.

6. The system according to claim 5, wherein said slip signal is dependent on said road friction coefficient signal, said steering angle signal and said vehicle speed signal.

7. The system according to claim 1, wherein said torque distributing means is a clutch.

8. The system according to claim 7, further comprising bypass means including a bypass shaft disposed around and connecting outputs of said central differential means, and said torque distributing means is disposed in said bypass connected to said bypass shaft, and said actuating means is for controlling said torque distribution ratio by controlling clutch torque of said clutch in dependency on said driving conditions.

9. The system according to claim 7 wherein the clutch is an oil hydraulic clutch having opposite disks which operates to transmit torque by difference between speeds of opposite disks and by pressure supplied to the clutch.

10. The system according to claim 1 wherein the central differential means is a planetary gear.

* * * * *